United States Patent
Ishii et al.

(10) Patent No.: US 9,369,627 B2
(45) Date of Patent: Jun. 14, 2016

(54) VIDEO PROCESSING APPARATUS, VIDEO PROCESSING SYSTEM, AND VIDEO PROCESSING METHOD

(75) Inventors: Masaki Ishii, Kanagawa (JP); Kenji Namie, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 220 days.

(21) Appl. No.: 14/003,371

(22) PCT Filed: Mar. 7, 2012

(86) PCT No.: PCT/JP2012/056487
§ 371 (c)(1),
(2), (4) Date: Sep. 5, 2013

(87) PCT Pub. No.: WO2012/121411
PCT Pub. Date: Sep. 13, 2012

(65) Prior Publication Data
US 2013/0342723 A1    Dec. 26, 2013

(30) Foreign Application Priority Data
Mar. 7, 2011    (JP) .................................. 2011-049373

(51) Int. Cl.
*H04N 5/232*    (2006.01)
*H04N 5/262*    (2006.01)
*G06T 3/00*    (2006.01)

(52) U.S. Cl.
CPC .............. *H04N 5/23229* (2013.01); *G06T 3/00* (2013.01); *H04N 5/232* (2013.01); *H04N 5/23206* (2013.01); *H04N 5/23296* (2013.01); *H04N 5/2628* (2013.01)

(58) Field of Classification Search
CPC .......... H04N 5/23229; H04N 5/23206; H04N 5/2628; H04N 5/232; H04N 5/23296; G06T 3/00
See application file for complete search history.

(56) References Cited

U.S. PATENT DOCUMENTS

| 7,268,803 B1 * | 9/2007 | Murata ................. G06T 3/4038 |
| | | 348/218.1 |
| 8,731,321 B2 | 5/2014 | Fujiwara et al. |

(Continued)

FOREIGN PATENT DOCUMENTS

| CN | 1898948 A | 1/2007 |
| EP | 1 668 227 A2 | 5/2006 |

(Continued)

OTHER PUBLICATIONS

Japanese Office Action issued Oct. 7, 2014, in Japan Patent Application No. 2011-049373.

(Continued)

*Primary Examiner* — Twyler Haskins
*Assistant Examiner* — Peter Chon
(74) *Attorney, Agent, or Firm* — Oblon, McClelland, Maier & Neustadt, L.L.P

(57) ABSTRACT

A video processing apparatus includes an image capturing apparatus and a processing apparatus connected to the image capturing apparatus. The image capturing apparatus includes an image obtaining unit that obtains a frame image; a frame image transmitting unit that transmits the frame image to the processing apparatus; a transformation parameter setting unit that sets transformation parameters received from the processing apparatus in the image capturing apparatus; an image transforming unit that applies an image transformation to the frame image using the transformation parameters thus set; and a transformed frame image transmitting unit that transmits a transformed frame image to the processing apparatus. The processing apparatus includes a transformation parameter calculating unit that calculates the transformation parameters for the image transformation, using the frame image received from the image capturing apparatus; and a transformation parameter transmitting unit that transmits the transformation parameters to the image capturing apparatus.

15 Claims, 11 Drawing Sheets

(56) References Cited

U.S. PATENT DOCUMENTS

| | | | |
|---|---|---|---|
| 2005/0180650 A1* | 8/2005 | Komagamine | G06T 5/006 382/254 |
| 2005/0271300 A1* | 12/2005 | Pina | G06K 9/4647 382/294 |
| 2006/0044394 A1 | 3/2006 | Read | |
| 2007/0097223 A1 | 5/2007 | Ono | |
| 2007/0132862 A1 | 6/2007 | Akasawa | |
| 2009/0002523 A1* | 1/2009 | Maekawa | G06T 3/00 348/231.2 |
| 2012/0230607 A1* | 9/2012 | Yamaji | H04N 1/3877 382/296 |
| 2012/0263394 A1 | 10/2012 | Fujiwara et al. | |
| 2013/0129251 A1* | 5/2013 | Ishii | H04N 5/2628 382/275 |

FOREIGN PATENT DOCUMENTS

| | | |
|---|---|---|
| EP | 1 699 277 A1 | 9/2006 |
| EP | 2 495 949 A1 | 9/2012 |
| JP | 09-261522 | 10/1997 |
| JP | 2003-319034 | 11/2003 |
| JP | 2004-072181 | 3/2004 |
| JP | 2005-086674 | 3/2005 |
| JP | 2006-042004 | 2/2006 |
| JP | 2007-067847 | 3/2007 |
| JP | 2007-166009 | 6/2007 |
| JP | 2008-060827 | 3/2008 |
| JP | 4630936 B1 | 2/2011 |
| WO | 2006/027915 A1 | 3/2006 |

OTHER PUBLICATIONS

The Extended European Search Report issued Nov. 10, 2014, in Application No. / Patent No. 12754659.6-1905/2684349.

International Search Report issued Apr. 10, 2012 in PCT/JP2012/056487 filed Mar. 7, 2012.

Office Action issued on Jan. 4, 2016, in Chinese Patent Application No. 201280011861.9, with English translation (16 pages).

* cited by examiner

VIDEO PROCESSING APPARATUS, VIDEO PROCESSING SYSTEM, AND VIDEO PROCESSING METHOD

TECHNICAL FIELD

The present invention relates to a technique for applying an image transformation to a video shot by a camera, and more particularly to a video processing apparatus, a video processing system, and a video processing method that perform the image transformation.

BACKGROUND ART

A television terminal and the like included in a teleconference system has a camera (image capturing apparatus) for shooting a scene in a meeting. This camera may be used not only for shooting a scene in a meeting, but also for capturing a manuscript, a drawing, and a whiteboard so that such information can be shared with a peer. Desired for such an application is an image transformation process, for example, for focusing on a partial area in a shot image and displaying an enlarged image of the area (digital zooming), or for correcting the image of a manuscript, a drawing, or a whiteboard shot from a diagonal angle so as to enable the image to appear as if the image is shot directly from the front side (perspective correction). Concerning to this issue, image transformation processing techniques such as digital zooming and a perspective correction for digital cameras are already known (Japanese Patent Application Laid-open No. 2004-72181 and Japanese Patent Application Laid-open No. 2008-60827, for example).

However, in the conventional image transformation processing techniques, when the digital zooming or the perspective correction is to be applied to sequential frame images, such as a video or an animation, in real time, it has been difficult to implement an image capturing apparatus with hardware such as an image signal processor (ISP) having every functions required for the processes. For example, to explain about the perspective correction, to perform the process for automatically detecting, from a shot image, an area (having a quadrangular shape) corresponding to a manuscript, a drawing, and a whiteboard that is a subject, the entire image has to be retrieved. Therefore, the process becomes relatively complex, and also requires a long processing time. Thus, to apply the process to a video or an animation, a hardware implementation using an ISP has been difficult or impossible.

The present invention has been made to enable an image transformation to be performed in real time to sequential frame images, such as a video and an animation, using an ISP and the like in an image capturing apparatus, and to speed up and to streamline the image transformation.

Specifically, an object of the present invention is to provide a video processing apparatus, a video processing system, a teleconference system, a remote surveillance system, a video processing method, and an image capturing apparatus that can speed up and streamline the image transformation.

DISCLOSURE OF INVENTION

According to an embodiment, there is provided a video processing apparatus that includes an image capturing apparatus and a processing apparatus connected to the image capturing apparatus. The image capturing apparatus includes an image obtaining unit that obtains a frame image; a frame image transmitting unit that transmits the frame image to the processing apparatus; a transformation parameter setting unit that sets transformation parameters received from the processing apparatus in the image capturing apparatus; an image transforming unit that applies an image transformation to the frame image using the transformation parameters thus set; and a transformed frame image transmitting unit that transmits a transformed frame image to the processing apparatus. The processing apparatus includes a transformation parameter calculating unit that calculates the transformation parameters for the image transformation, using the frame image received from the image capturing apparatus; and a transformation parameter transmitting unit that transmits the transformation parameters to the image capturing apparatus.

According to another embodiment, there is provided a video processing system that includes an image capturing apparatus and a processing apparatus connected to the image capturing apparatus over a network. The image capturing apparatus includes an image obtaining unit that obtains a frame image; a frame image transmitting unit that transmits the frame image to the processing apparatus over the network; a transformation parameter setting unit that sets transformation parameters received from the processing apparatus over the network in the image capturing apparatus; an image transforming unit that applies an image transformation to the frame image using the transformation parameters thus set; and a transformed frame image transmitting unit that transmits a transformed frame image to the processing apparatus over the network. The processing apparatus includes a transformation parameter calculating unit that calculates the transformation parameters for the image transformation, using the frame image received from the image capturing apparatus over the network; and a transformation parameter transmitting unit that transmits the transformation parameters to the image capturing apparatus over the network.

According to still another embodiment, there is provided a video processing method for processing a frame image using an image capturing apparatus and a processing apparatus connected to the image capturing apparatus. The video processing method includes obtaining, by the image capturing apparatus, a frame image and transmitting the frame image to the processing apparatus; calculating, by the processing apparatus, transformation parameters for an image transformation using the frame image received from the image capturing apparatus, and transmitting the transformation parameters to the image capturing apparatus; and setting, by the image capturing apparatus, in the image capturing apparatus, the transformation parameters received from the processing apparatus, applying the image transformation to the frame image using the transformation parameters thus set, and transmitting a transformed frame image to the processing apparatus.

BEST MODE(S) FOR CARRYING OUT THE INVENTION

Embodiments of the present invention will now be explained with reference to the accompanying drawings.

In the embodiments below, a perspective correction and digital zooming will be explained as image transformations. However, it should be needless to say that the present invention is also applicable to various image transformations other than these.

First Embodiment

A video processing apparatus according to a first embodiment includes an image capturing apparatus and a processing apparatus connected to the image capturing apparatus. When a perspective correction as an image transformation is to be applied to a frame image shot by the image capturing apparatus and a transformed frame image is to output, the processing apparatus connected to the image capturing apparatus is used to perform an automatic detection of a subject area and a calculation of transformation parameters, both of which require relatively complex processes, and transmits the transformation parameters to the image capturing apparatus. The image capturing apparatus then performs the perspective correction as an image transformation process that is a relatively simple process, using the transformation parameters, and transmits the transformed frame image to the processing apparatus. Furthermore, different transmission rates are used for transmitting the frame image from the image capturing apparatus to the processing apparatus for the calculation of the transformation parameters and the transformed frame image.

To begin with, a perspective correction will be explained with reference to FIGS. 1 to 3.

Figure 1:
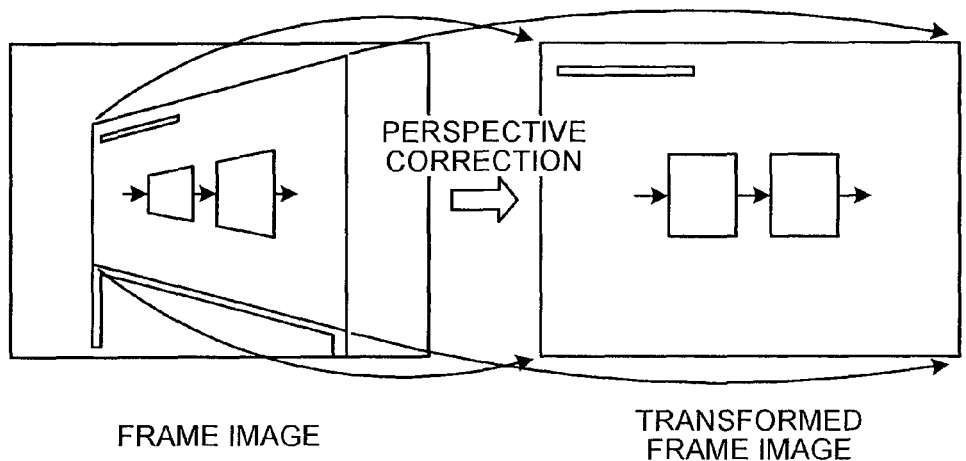
FIG. 1 is a conceptual schematic of a perspective correction.

FIG. 1 is a conceptual schematic of the perspective correction. In the drawing, illustrated on the left side is an example of a frame image of a whiteboard that is a subject shot from a diagonal angle, and illustrated on the right side is an example of a transformed frame image that is the frame image applied with the perspective correction. A perspective correction is a process of generating an image appearing as if the image were shot directly from the front, even if the whiteboard that is a subject is imaged from a diagonal angle.

Figure 2:
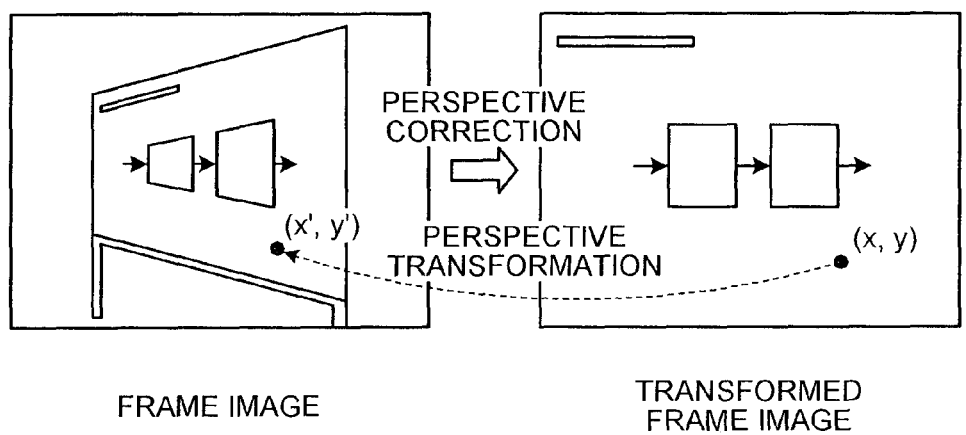
FIG. 2 is a schematic for explaining a perspective transformation.

FIG. 2 is a schematic for explaining a perspective transformation (an inverse process of the perspective correction). The perspective transformation is a transformation of coordinates from a pixel (x, y) in the transformed frame image to a pixel (x', y') on the frame image. The transformation equation can be expressed as:

$$\begin{pmatrix} x' \\ y' \\ 1 \end{pmatrix} = \begin{pmatrix} k_0 & k_1 & k_2 \\ k_3 & k_4 & k_5 \\ k_6 & k_7 & 1 \end{pmatrix} \begin{pmatrix} x \\ y \\ 1 \end{pmatrix} \quad (1)$$

using a matrix. At this time, the elements $k_0$, $k_1$, $k_2$, $k_3$, $k_4$, $k_5$, $k_6$, and $k_7$ in the matrix are transformation parameters.

To generate the transformed frame image applied with the perspective correction, it is necessary to determine the luminance of each pixel in the frame image corresponding to the luminance of each pixel in the transformed frame image. To achieve this goal, it is necessary to know which pixel in the transformed frame image corresponds to which pixel in the original frame image. To calculate the coordinates of the pixel in the original frame image, the transformation equation indicated above as Equation (1) is used. In addition, to calculate the coordinates, the transformation parameters have to be precalculated.

Figure 3:
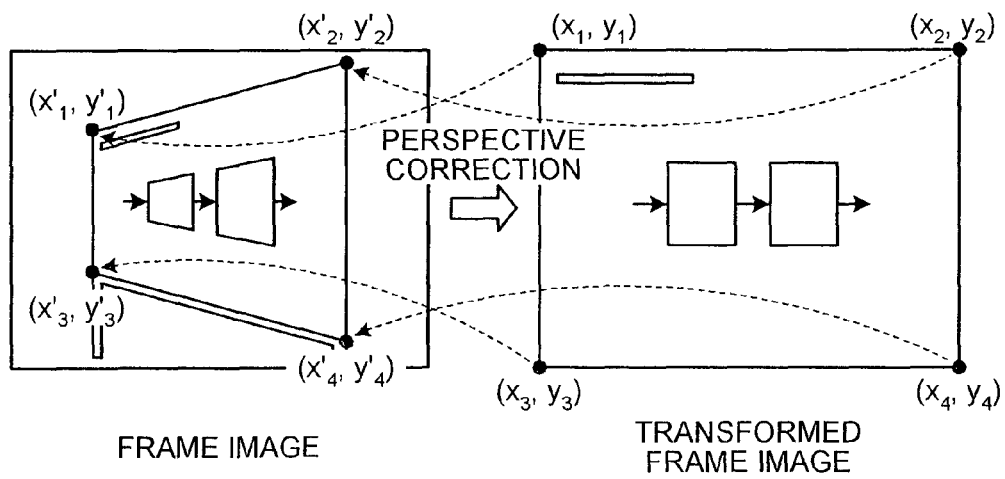
FIG. 3 is a schematic for explaining how transformation parameters are calculated.

FIG. 3 is a schematic for explaining how the transformation parameters are calculated. The transformation parameter can be calculated using the coordinates of four corners of a whiteboard included in the frame image and the coordinates of the four corners of the transformed frame image, and solving the matrix equation below.

$$\begin{pmatrix} x'_1 & x'_2 & x'_3 & x'_4 \\ y'_1 & y'_2 & y'_3 & y'_4 \\ 1 & 1 & 1 & 1 \end{pmatrix} = \begin{pmatrix} k_0 & k_1 & k_2 \\ k_3 & k_4 & k_5 \\ k_6 & k_7 & 1 \end{pmatrix} \begin{pmatrix} x_1 & x_2 & x_3 & x_4 \\ y_1 & y_2 & y_3 & y_4 \\ 1 & 1 & 1 & 1 \end{pmatrix} \quad (2)$$

The coordinates of the four corners of the transformed frame image are determined based on the size of the transformed frame image. For example, when the upper left corner of the image is used as a point of origin, the positive direction of an X-coordinate is on the right side, the positive direction of a Y-coordinate is on the lower side, and when the size of the transformed frame image is the Video Graphics Array (VGA) (640 pixels×480 pixels), the coordinates of the four corners will be $(x_1, y_1)=(0, 0)$, $(x_2, y2)=(639, 0)$, $(x_3, y_3)=(0, 479)$, and $(x_4, y_4)=(639, 479)$.

In the first embodiment, the processing apparatus is used to perform a relatively complex process of detecting the coordinates of the four corners of the whiteboard from the frame image and calculating the transformation parameters from Equation (2), while an image capturing apparatus is used to perform a relatively simple process of applying the perspective correction to the frame image using Equation (1) to generate the transformed frame image. Furthermore, different transmission rates are used for transmitting the frame image from the image capturing apparatus to the processing apparatus for the calculation of the transformation parameters and the transformed frame image.

Figure 4:
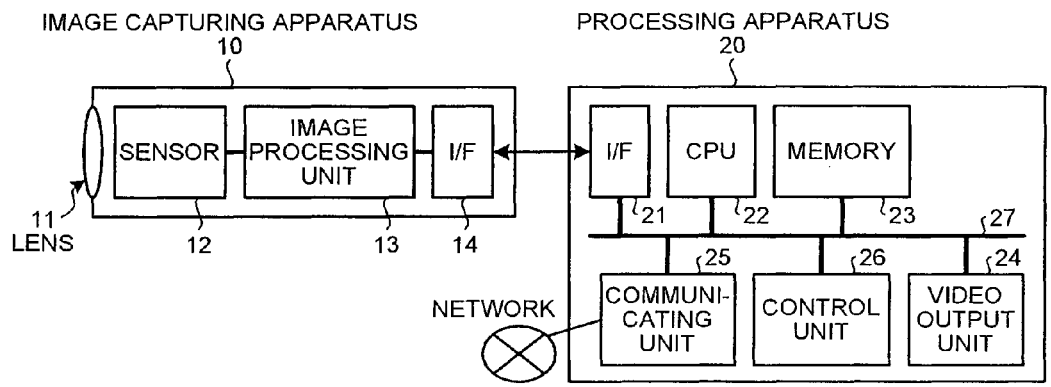
FIG. 4 is a schematic of a structure of a video processing apparatus according to a first embodiment of the present invention.

FIG. 4 illustrates an example of a structure of the video processing apparatus according to the first embodiment. The video processing apparatus according to the first embodiment includes at least an image capturing apparatus 10 and a processing apparatus 20. The processing apparatus 20 is a personal computer, for example. The image capturing apparatus 10 and the processing apparatus 20 are connected over a wire (e.g., a universal serial bus (USB)) or wirelessly.

The image capturing apparatus 10 includes a lens 11, a sensor 12, such as a charge-coupled device (CCD) or a complementary metal oxide semiconductor (CMOS), for converting an optical image imaged by the lens 11 into a frame image in the form of an electrical signal, an image processing unit 13 such as an ISP that performs various image processes to a frame image, and an interface (I/F) unit 14 that exchanges a frame image, a transformed frame image, other types of data, and control signals with the processing apparatus 20.

The processing apparatus 20 includes an I/F unit 21 that exchanges a frame image, a transformed frame image, other types of data, and control signals with the image capturing apparatus 10, a central processing unit (CPU) 22 that executes various processes, a memory 23 storing therein various types of software and data required for processes executed by the CPU 22, a frame image, a transformed frame image, and the like, a video output unit 24 that transmits a video signal to a monitor (not illustrated) and the like connected to the processing apparatus 20, a communicating unit 25 that transmits a video signal and the like to another apparatus connected over a network, a control unit 26 that controls the entire apparatus, and a bus 27 connecting each of these units. A random access memory (RAM), a read-only memory (ROM), a hard disk drive (HDD), and the like are collectively referred to as the memory 23. A user operation instruction receiving unit and the like are also included, but omitted in FIG. 4.

In the video processing apparatus according to the first embodiment, the image processing unit 13 included in the image capturing apparatus 10 has an image transformation function for the perspective correction, and the CPU 22 included in the processing apparatus 20 has a transformation parameter calculating function.

Figure 5:
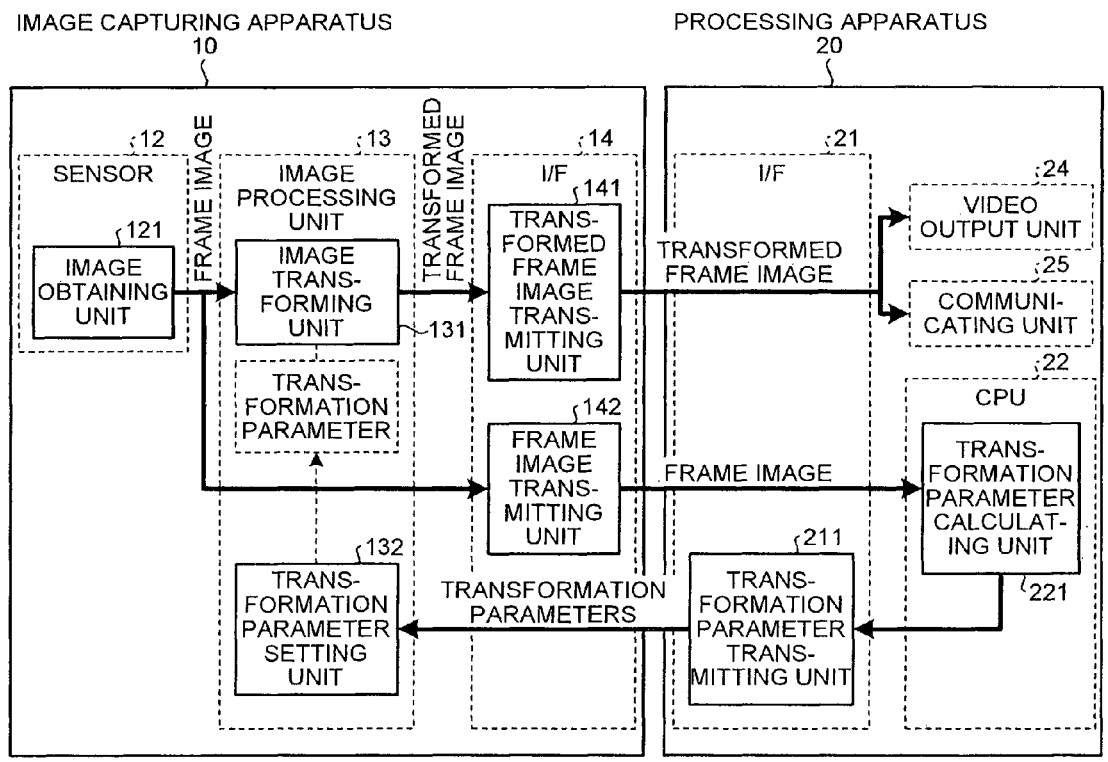
FIG. 5 is a functional block diagram of the video processing apparatus according to the first embodiment.

FIG. 5 illustrates an overall functional block diagram of the video processing apparatus according to the first embodiment. In the image capturing apparatus 10, an image obtaining unit 121 generates a frame image, and transmits the frame image to an image transforming unit 131 and a frame image transmitting unit 142. The frame image transmitting unit 142 transmits the frame image to the processing apparatus 20. In the processing apparatus 20, a transformation parameter calculating unit 221 calculates the transformation parameters from the frame image, and transmits the transformation parameters to a transformation parameter transmitting unit 211. The transformation parameter transmitting unit 211 transmits the transformation parameters to the image capturing apparatus 10. In the image capturing apparatus 10, a transformation parameter setting unit 132 sets the transformation parameters in the image processing unit 13. The image transforming unit 131 generates a transformed frame image by applying the perspective correction to the frame image based on the transformation parameters thus set, and transmits the transformed image to a transformed frame image transmitting unit 141. The transformed frame image transmitting unit 141 transmits the transformed frame image to the processing apparatus 20. The processing apparatus 20 displays the transformed frame image onto a video output apparatus such as a display connected to the processing apparatus 20, or transmits the transformed frame image to another apparatus connected over a network.

Figure 6:
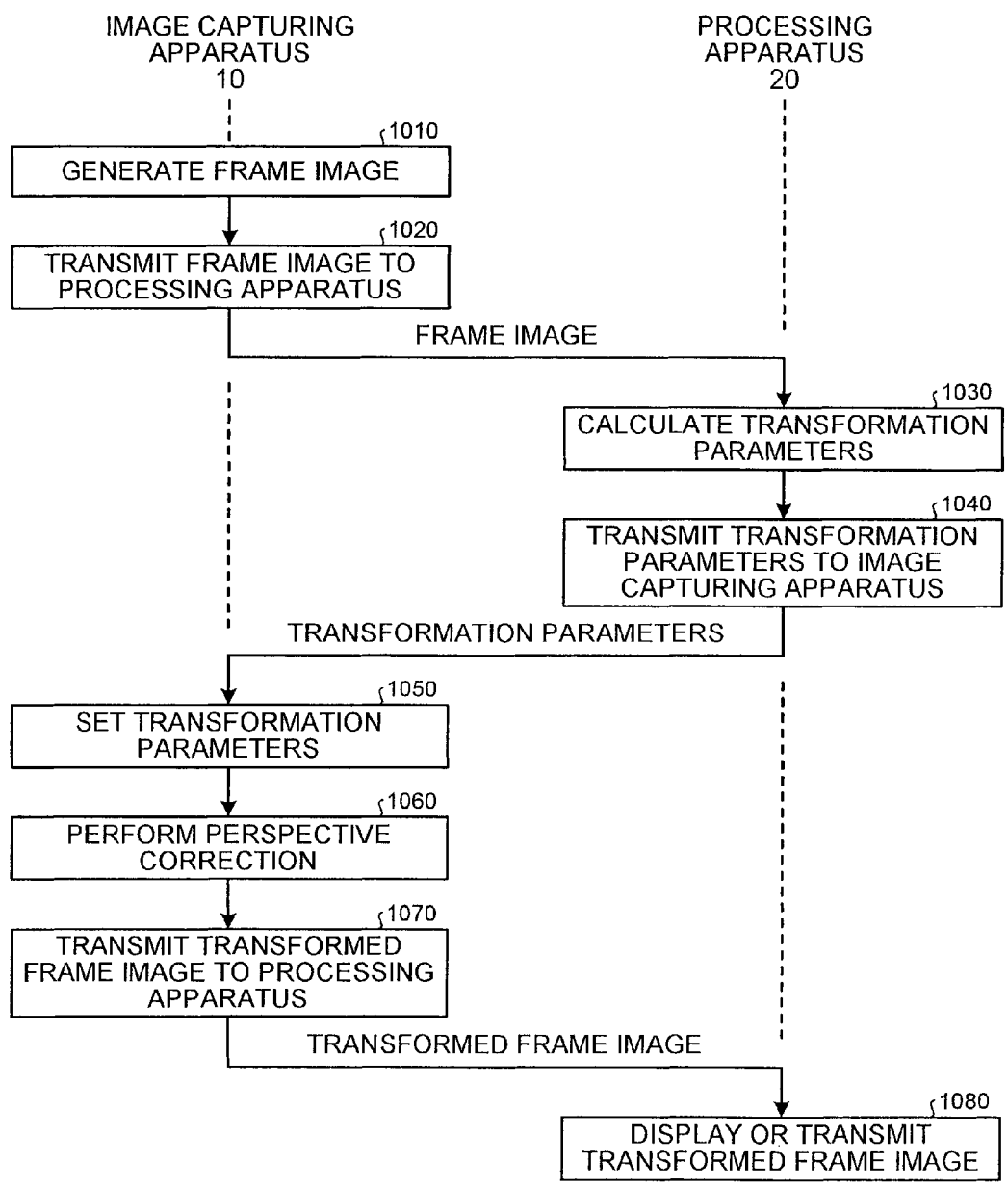
FIG. 6 is a processing flowchart for the video processing apparatus according to the first embodiment.

FIG. 6 illustrates a processing flowchart corresponding to the functional block diagram illustrated in FIG. 5. Operations performed by the image capturing apparatus 10 and the processing apparatus 20 according to the first embodiment will now be explained in detail with reference to FIG. 6.

In the image capturing apparatus 10, the image obtaining unit (sensor) 121 converts an optical image into electrical signals to generate a frame image, and transmits the frame image to the image transforming unit 131 and the frame image transmitting unit 142 (Step 1010). The frame image transmitting unit 142 transmits the frame image to the processing apparatus 20 (Step 1020). Because the frame image is used for calculating the transformation parameters, the frame image does not necessarily have to be transmitted to the processing apparatus 20 in real time. Therefore, the frame image may be transmitted at a transmission rate that is lower than the rate at which the transformed frame image is transmitted from the transformed frame image transmitting unit 141.

In the processing apparatus 20, the transformation parameter calculating unit (CPU) 221 calculates the transformation parameters from the frame image (Step 1030). Specifically, the transformation parameter calculating unit 221 calculates the transformation parameters by detecting, from the frame image, an area corresponding to the whiteboard that is a subject, substituting the coordinates of the four corners of the area and the coordinates of the four corners of the transformed frame image, which can be determined based on the image size in advance, to the equation indicated in Equation (2), and solving the equation (see FIG. 3).

The process of detecting the coordinates of the four corners of the whiteboard from the frame image is performed in a manner explained below, for example.

Step 1: Generate a shading image (luminance image) from the frame image.

Step 2: Detect edges from the shading image to detect the four sides of the whiteboard.

Step 3: Calculate intersections between two adjacent sides to calculate the coordinates of the four corners of the whiteboard.

Japanese Patent Application Laid-open No. 2007-67847, for example, discloses a method for automatically detecting an area corresponding to a whiteboard, and the disclosed method may be used in detecting an area corresponding to a whiteboard from the frame image.

Referring back to FIG. 6, a transformation parameter transmitting unit 211 in the processing apparatus 20 transmits the transformation parameters to the image capturing apparatus 10 (Step 1040).

In the image capturing apparatus 10, the transformation parameter setting unit 132 sets the transformation parameters received from the processing apparatus 20 in a memory included in the image processing unit (e.g., ISP) 13 (Step 1050).

The image transforming unit 131 generates a transformed frame image by applying the perspective transformation to the frame image received from the image obtaining unit 121 using the transformation parameters set in the image processing unit 13 (Step 1060). Specifically, the following process is performed (see FIG. 2).

Step 1: Determine a pixel whose luminance is to be calculated in the transformed frame image (where, the coordinates of the pixel are (x, y)).

Step 2: Calculate the coordinates (x', y') of a pixel in the frame image that corresponds to the coordinates (x, y), using the transformation equation indicated in Equation (1).

Step 3: Calculate the luminance at the coordinates (x', y').

Step 4: Set the luminance at the coordinates (x', y') as the luminance at the coordinates (x, y).

The image transforming unit 131 repeats the processes at Step 1 to Step 4 until the luminance is determined for all of the pixels in the transformed frame image.

The transformed frame image transmitting unit 141 transmits the transformed frame image to the processing apparatus 20 (Step 1070). In practice, the image transforming unit 131 and the transformed frame image transmitting unit 141 operate in parallel. The transformed frame image is transmitted at a higher speed compared with the frame image transmitted to calculate the transformation parameters.

The processing apparatus 20 displays the transformed frame image received from the image capturing apparatus 10 onto a video output device such as a display through the video output unit 24 or transmits the transformed frame image to another apparatus through the communicating unit 25 over a network, for example (Step 1080).

When the coordinates of the area corresponding to the whiteboard remains the same between frame images (when the position of the whiteboard or the camera is not changed), the transformation parameters do not need to be recalculated for each of the frame images. Therefore, in practice, it is preferable to use methods described below. In this manner, the process can be streamlined.

Method 1: When the position of the whiteboard or the camera is changed, the transformation parameters are recalculated based on a user instruction. In such a case, in the image capturing apparatus 10, the frame image transmitting unit 142 transmits a frame image to the processing apparatus 20 only when the user instruction is received. Upon receiving the frame image, the transformation parameter calculating unit 221 in the processing apparatus 20 recalculates the transformation parameters, and the transformation parameter transmitting unit 211 transmits the transformation parameters to the image capturing apparatus 10. In the image capturing apparatus 10, the transformation parameter setting unit 132 sets the transformation parameters again, and the image transforming unit 131 keeps applying the perspective correction to frame images from the image obtaining unit 121 using the transformation parameters thus set.

Method 2: The transformation parameters are recalculated at a regular interval regardless of whether the position of the whiteboard or the camera is changed. In such a case, in the image capturing apparatus 10, the frame image transmitting unit 142 transmits frame images to the processing apparatus 20 at the regular interval. In the processing apparatus 20, the transformation parameter calculating unit 221 recalculates the transformation parameters, and the transformation parameter transmitting unit 211 transmits the transformation parameters to the image capturing apparatus 10 at the regular interval. In the image capturing apparatus 10, the transformation parameter setting unit 132 sets the transformation parameters again, and the image transforming unit 131 keeps applying the perspective correction to the frame images from the image obtaining unit 121 using the transformation parameters thus set.

The video processing apparatus according to the first embodiment can generate a transformed frame image that is a frame image obtained by shooting applied with the perspective correction at a high speed and efficiently. Furthermore, by lowering the transmission rate of the frame image used for calculating the transformation parameters, the transmission of the transformed frame image, which should be mainly transmitted, can be performed at a higher speed.

Second Embodiment

A video processing apparatus according to a second embodiment has following characteristics. The video processing apparatus includes an image capturing apparatus and a processing apparatus connected to the image capturing apparatus. When digital zooming as an image transformation is to be applied to a frame image shot by the image capturing apparatus and a transformed frame image is to output, the processing apparatus connected to the image capturing apparatus is used to perform a calculation of transformation parameters required for the digital zooming, and transmits the transformation parameters to the image capturing apparatus. The image capturing apparatus then performs the digital zooming process using the transformation parameters, and transmits the transformed frame image applied with the digital zooming to the processing apparatus. In the second embodiment as well, different transmission rates are used for transmitting the frame image from the image capturing apparatus to the processing apparatus for the calculation of the transformation parameters and the transformed frame image (a lower transmission rate is used for the frame image). To begin with, the digital zooming will be explained with reference to FIGS. 7 to 9.

Figure 7:
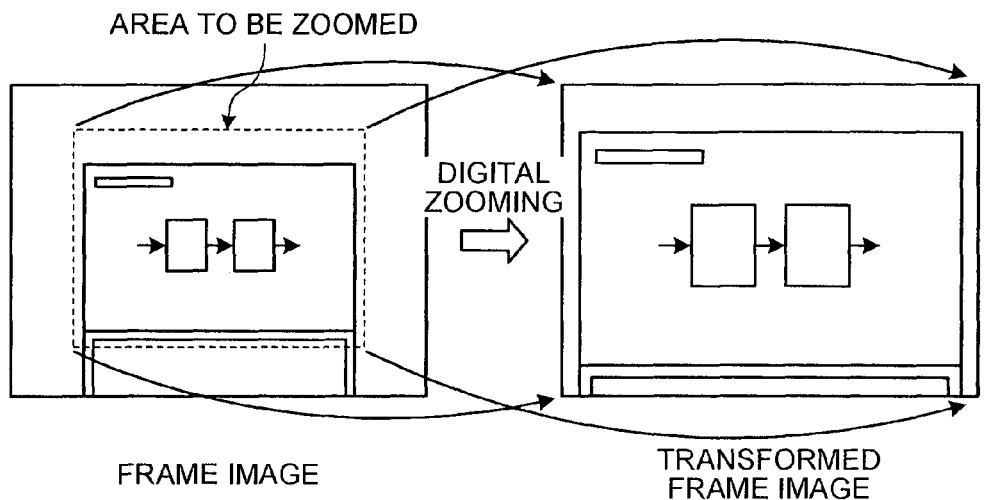
FIG. 7 is a conceptual schematic of digital zooming.

FIG. 7 is a conceptual schematic of the digital zooming. In the drawing, illustrated on the left side is a frame image in which a whiteboard that is a subject is imaged, and illustrated on the right side is an example of a transformed frame image that is a frame image applied with a process corresponding to the digital zooming (zoom-in).

Figure 8:
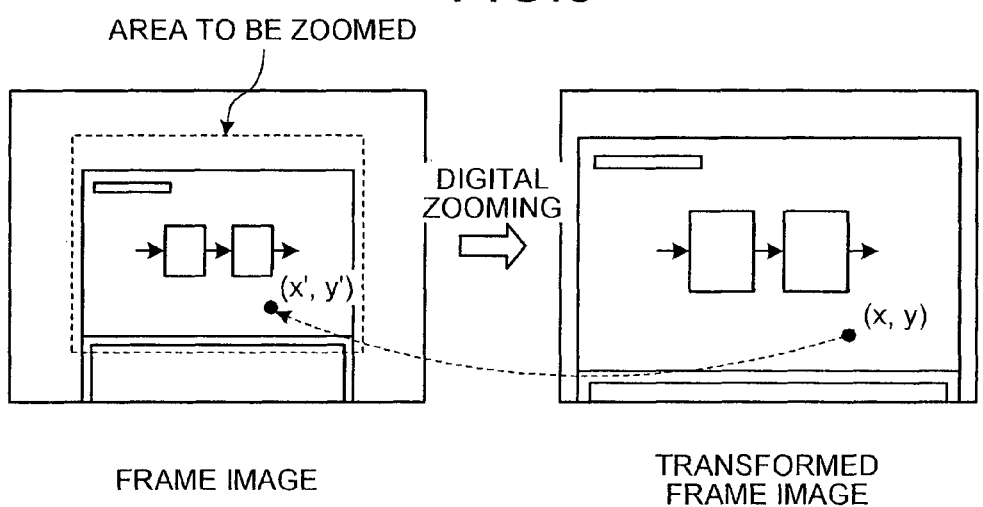
FIG. 8 is a schematic for explaining an inverse process of the digital zooming.

FIG. 8 is a schematic for explaining an inverse process of the digital zooming. An inverse process of the digital zooming herein means a coordinates transformation from a pixel (x, y) in the transformed frame image to a pixel (x', y') in the frame image, and the transformation equation can be expressed as:

$$\begin{pmatrix} x' \\ y' \\ 1 \end{pmatrix} = \begin{pmatrix} k_0 & k_1 & k_2 \\ k_3 & k_4 & k_5 \\ k_6 & k_7 & 1 \end{pmatrix} \begin{pmatrix} x \\ y \\ 1 \end{pmatrix} \quad (3)$$

using a matrix. Equation (3) is the same as Equation (1) mentioned earlier, and the transformation parameters are elements $k_0$, $k_1$, $k_2$, $k_3$, $k_4$, $k_5$, $k_6$, and $k_7$ in the matrix.

To generate the transformed frame image applied with the digital zooming, it is necessary to determine the luminance of each pixel in the frame image corresponding to the luminance of each pixel in the transformed frame image. To achieve this goal, it is necessary to know which pixel in the transformed frame image corresponds to which pixel in the original frame image. To calculate the coordinates of the pixel in the original frame image, Equation (3) mentioned above is used. In addition, to calculate the coordinates, the transformation parameters have to be precalculated.

Figure 9:
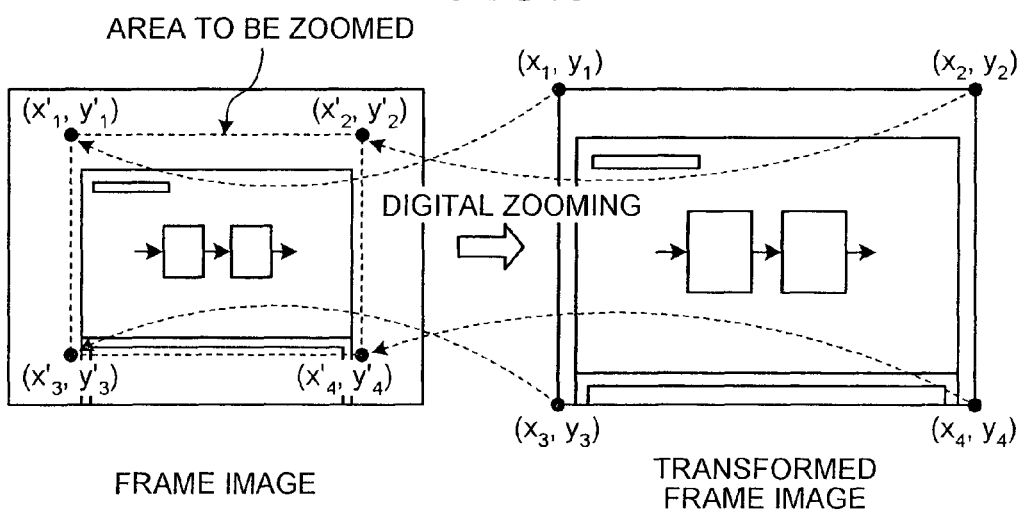
FIG. 9 is a schematic for explaining how transformation parameters for the digital zooming are calculated.

FIG. 9 is a schematic for explaining how the transformation parameters are calculated. This is basically the same with the schematic illustrated in FIG. 3. The transformation parameter can be calculated using the coordinates of four corners of an area to be zoomed included in the frame image and the coordinates of the four corners of the transformed frame image, and solving the matrix equation below $$\begin{pmatrix} x'_1 & x'_2 & x'_3 & x'_4 \\ y'_1 & y'_2 & y'_3 & y'_4 \\ 1 & 1 & 1 & 1 \end{pmatrix} = \begin{pmatrix} k_0 & k_1 & k_2 \\ k_3 & k_4 & k_5 \\ k_6 & k_7 & 1 \end{pmatrix} \begin{pmatrix} x_1 & x_2 & x_3 & x_4 \\ y_1 & y_2 & y_3 & y_4 \\ 1 & 1 & 1 & 1 \end{pmatrix} \quad (4)$$

The area to be zoomed in the frame image is determined based on the press-down state of a zoom button. On the contrary, the coordinates of the four corners of the transformed frame image are uniquely determined based on the size of the transformed frame image, in the same manner as in the first embodiment.

In the second embodiment, a processing apparatus is used to perform a relatively complex process of obtaining the coordinates of the four corners of the area to be zoomed in the frame image and calculating the transformation parameters from Equation (4), and an image capturing apparatus is used to perform a relatively simple process of performing the digital zooming using Equation (3) to generate the transformed frame image applied with digital zooming, in the same manner as in the first embodiment. Furthermore, in the second embodiment as well, different transmission rates are used for transmitting the frame image from the image capturing apparatus to the processing apparatus for the calculation of the transformation parameters and the transformed frame image.

Figure 10:
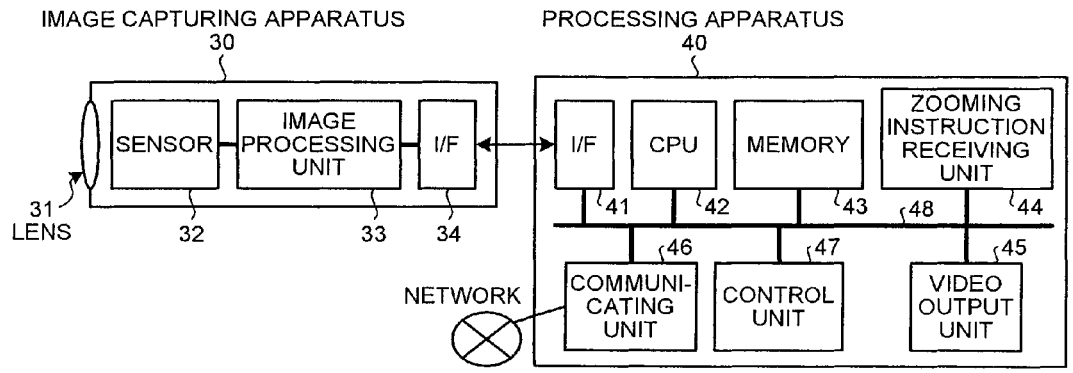
FIG. 10 is a schematic of a structure of a video processing apparatus according to a second embodiment of the present invention.

FIG. 10 illustrates an example of a structure of a video processing apparatus according to the second embodiment. The video processing apparatus according to the second embodiment includes at least an image capturing apparatus 30 and a processing apparatus (e.g., personal computer) 40. The image capturing apparatus 30 and the processing apparatus 40 are connected over a wire (e.g., a USB) or wirelessly.

The image capturing apparatus 30 includes a lens 31, a sensor 32 such as a CCD or a CMOS for converting an optical image imaged by the lens 31 into a frame image in the form of an electrical signal, an image processing unit 33 such as an ISP that performs various image processes to a frame image, and an I/F unit 34 that exchanges a frame image, a transformed frame image, other types of data, and control signals with the processing apparatus 40.

The processing apparatus 40 includes an I/F unit 41 that exchanges a frame image, a transformed frame image, other types of data, and control signals with the image capturing apparatus 30, a CPU 42 that executes various processes, a memory 43 storing therein various types of software and data required for processes executed by the CPU 42, a frame image, a transformed frame image, and the like, a zooming instruction receiving unit 44 that receives a zooming instruction from a user, a video output unit 45 that transmits a video signal to a monitor and the like connected to the processing apparatus 40, a communicating unit 46 that transmits a video signal and the like to another apparatus connected over a network, a control unit 47 that controls the entire apparatus, and a bus 48 connecting each of these units. In the second embodiment as well, a RAM, a ROM, an HDD, and the like are collectively referred to as the memory 43.

In the video processing apparatus according to the second embodiment, the image processing unit 33 in the, image capturing apparatus 30 has an image transformation function for the digital zooming, and the CPU 42 in the processing apparatus 40 has a transformation parameter calculating function.

Possible methods for receiving the zooming instruction from a user include a zoom-in/zoom-out button provided to the processing apparatus 40 itself, or a zoom-in/zoom-out button provided to an operation remote controller. In an explanation below, a zoom-in button and a zoom-out button provided to the processing apparatus 40 itself are used to receive user instructions.

Figure 11:
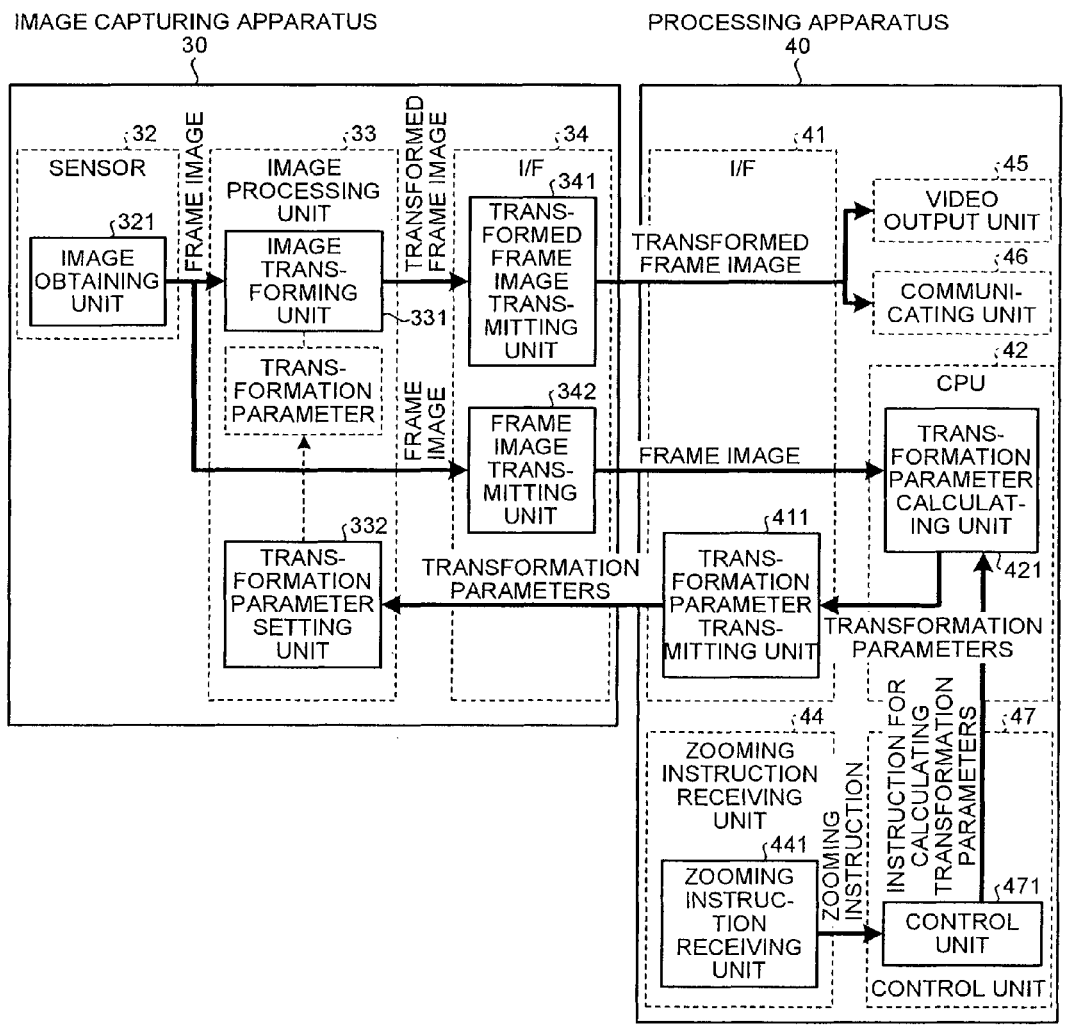
FIG. 11 is a functional block diagram of the video processing apparatus according to the second embodiment.

FIG. 11 illustrates an overall functional block diagram of the video processing apparatus according to the second embodiment. In the image capturing apparatus 30, an image obtaining unit 321 generates a frame image, and transmits the frame image to an image transforming unit 331 and a frame image transmitting unit 342. The frame image transmitting unit 342 transmits the frame image to the processing apparatus 40. In the processing apparatus 40, when a zoom-in/zoom-out instruction is received from a user, the zooming instruction receiving unit 441 notifies a control unit 471 with the instruction, and the control unit 471 instructs a transformation parameter calculating unit 421 to calculate the transformation parameters. The transformation parameter calculating unit 421 calculates the transformation parameters based on the frame image and the press-down state of the zoom button, and transmits the transformation parameters to a transformation parameter transmitting unit 411. The transformation parameter transmitting unit 411 transmits the transformation parameters to the image capturing apparatus 30. In the image capturing apparatus 30, a transformation parameter setting unit 332 sets the transformation parameters in the image processing unit 33. The image transforming unit 331 applies the digital zooming process to the frame image based on transformation equation using the transformation parameters thus set, to generate a transformed frame image, and transmits the transformed image to a transformed frame image transmitting unit 341. The transformed frame image transmitting unit 341 transmits the transformed frame image to the processing apparatus 40. The processing apparatus 40 displays the transformed frame image onto a video output device such as a display connected to the processing apparatus 40, or transmits the transformed frame image to another apparatus connected over a network.

When no zooming instruction is received from a user, the image transforming unit 331 in the image capturing apparatus 30 transmits the frame image received from the image obtaining unit 321 as it is to the transformed frame image transmitting unit 341, and the transformed frame image transmitting unit 341 also transmits the frame image as it is to the processing apparatus 40.

Figure 12:
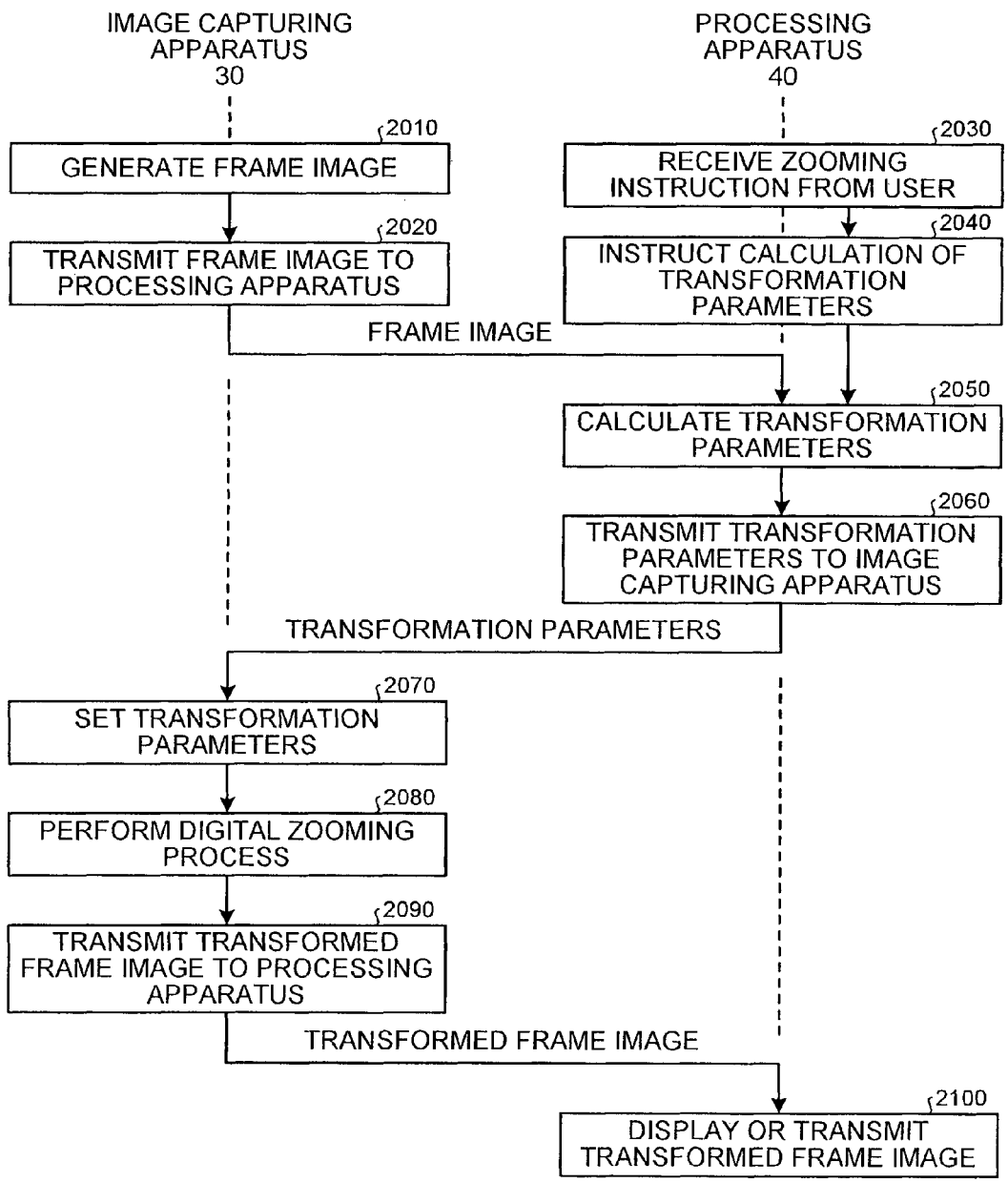
FIG. 12 is a processing flowchart for the video processing apparatus according to the second embodiment.

FIG. 12 illustrates a processing flowchart corresponding to the functional block diagram illustrated in FIG. 11. Operations performed by the image capturing apparatus 30 and the processing apparatus 40 according to the second embodiment will now be explained in detail with reference to FIG. 12.

In the image capturing apparatus 30, the image obtaining unit (sensor) 321 converts the optical image passed through a lens into an electrical signal to generate a frame image, and transmits the frame image to the image transforming unit 331 and the frame image transmitting unit 342 (Step 2010). Usually, the image transforming unit 331 transmits the frame image received from the image obtaining unit 321 as it is to the transformed frame image transmitting unit 341, and the transformed frame image transmitting unit 341 also transmits the frame image as it is to the processing apparatus 40, although these steps are omitted in FIG. 12.

The frame image transmitting unit 342 also transmits the frame image to the processing apparatus 40 (Step 2020). In the second embodiment as well, because the frame image is used for calculating the transformation parameters, the frame image does not necessarily have to be transmitted to the processing apparatus 40 in real time. Therefore, the frame image may be transmitted at a transmission rate that is lower than the rate at which the frame image or the transformed frame image is transmitted from the transformed frame image transmitting unit 341.

The frame image transmitting unit 342 may transmit a frame image to the processing apparatus 40 only when a zooming instruction is received from a user. Notification of the zooming instruction received from the user may be performed by a zooming instruction receiving unit 441 to be described later or the control unit 471 included in the processing apparatus 40.

In the processing apparatus 40, when a user makes a zooming instruction on a zoom-in/zoom-out button provided to the processing apparatus itself, the zooming instruction receiving unit 441 receives the zooming instruction, and notifies the control unit 471 with the instruction (Step 2030). The control unit 471 instructs the transformation parameter calculating unit 421 to calculate the transformation parameters (Step 2040).

The transformation parameter calculating unit 421 calculates the transformation parameters for the digital zooming based on the coordinates of four corners of the area to be zoomed in the frame image and the coordinates of the four corners of the transformed frame image (Step 2050). Specifically, the transformation parameters are calculated by substituting the coordinates of the four corners of the area to be zoomed in the frame image to the equation indicated in Equation (4), and solving the equation (see FIG. 9). The image area to be zoomed will be explained later. The transformation parameter transmitting unit 411 transmits the transformation parameters to the image capturing apparatus 30 (Step 2060).

In the image capturing apparatus 30, the transformation parameter setting unit 332 sets the transformation parameters received from the processing apparatus 40 in the memory included in the image processing unit 33 (Step 2070).

The image transforming unit 331 generates a transformed frame image by applying the digital zooming to the frame image received from the image obtaining unit 321 using the transformation parameters set in the image processing unit 33 (Step 2080). Specifically, the following process is performed (see FIG. 8). This process is basically the same as the process performed for the perspective correction.

Step 1: Determine a pixel whose luminance is to be calculated in the transformed frame image (where, the coordinates of the pixel are (x, y)).

Step 2: Calculate the coordinates (x', y') of a pixel in the frame image corresponding to the coordinates (x, y) using the transformation equation indicated in Equation (3).

Step 3: Calculate the luminance at the coordinates (x', y').

Step 4: Set the luminance at the coordinates (x', y') as the luminance at the coordinates (x, y).

The image transforming unit 331 repeats the processes at Step 1 to Step 4 until the luminance is determined for all of the pixels in the transformed frame image.

The transformed frame image transmitting unit 341 transmits the transformed frame image to the processing apparatus 40 (Step 2090). In practice, the image transforming unit 331 and the transformed frame image transmitting unit 341 operate in parallel.

Subsequently, if the press-down state of the zoom button remains the same, the image transforming unit 331 keeps performing the digital zooming process to the frame image using the set transformation parameters, and the transformed frame image transmitting unit 341 sequentially transmits the transformed frame images to the processing apparatus 40.

The processing apparatus 40 displays the transformed frame image received from the image capturing apparatus 30 onto a video output device such as a display through the video output unit 24 or transmits the transformed frame image to another apparatus through the communicating unit 25 over a network, for example (Step 2100).

Figure 13:
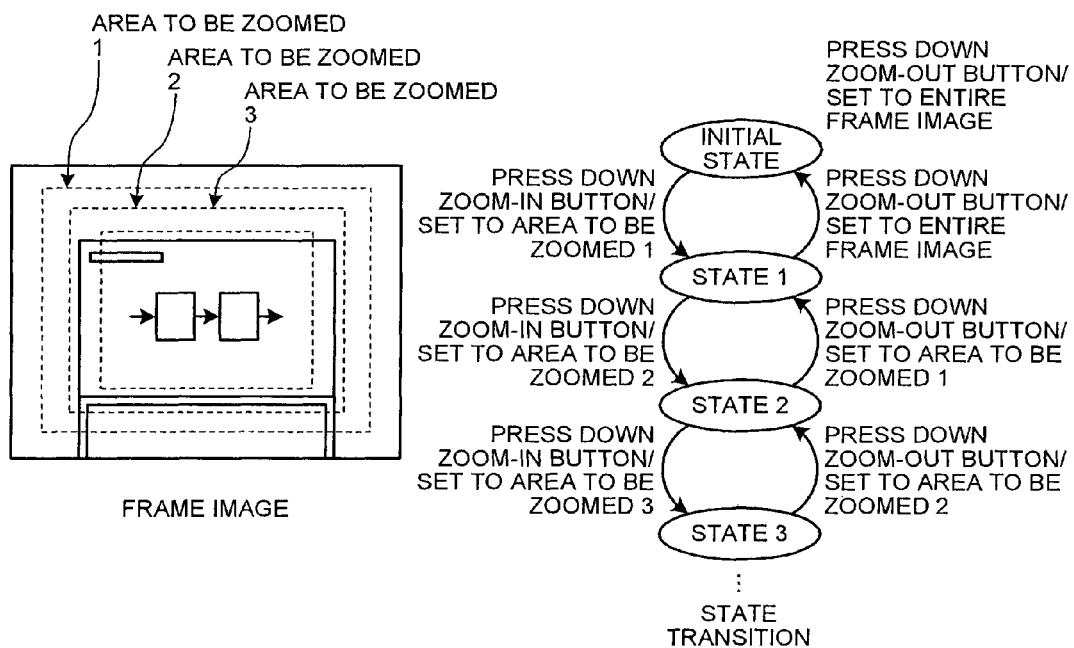
FIG. 13 is a schematic for explaining an area to be zoomed and a state transition.

FIG. 13 illustrates the relationship between the area to be zoomed in the frame image and a pressing operation of the zoom-in/zoom-out button. An area to be zoomed is a rectangular area sharing the same center as the frame image, as illustrated in the drawing on the left side. A plurality of areas to be zoomed is specified in advance, and the press-down state of the zoom-in button/zoom-out button determines which area to be zoomed is to be displayed. The state transition is illustrated in the drawing on the right side. The state information needs to be stored in the processing apparatus, and is updated every time the zoom-in button/zoom-out button is pressed.

The actual state transition will be explained briefly. If the zoom-in button is pressed from an initial state, the digital zooming process is performed so as to display the area to be zoomed 1, and the state transits to the state 1. If the zoom-in button is further pressed in the state 1, the digital zooming process is performed so as to display the area to be zoomed 2, and the state transits to the state 2. If the zoom-out button is pressed in the state 2, the digital zooming process is performed so as to display the area to be zoomed 1, and the state returns to the state 1.

The video processing apparatus according to the second embodiment can generate a transformed frame image that is a frame image obtained by shooting applied with zoom-in/zoom-out (digital zooming) at a high speed and efficiently. Furthermore, by reducing the transmission rate of the frame image used for calculating the transformation parameters, the transmission of the transformed frame image, which should be mainly transmitted, can be performed at a higher speed.

The first embodiment and the second embodiment may be combined. In such a case, most structures and functions can be shared.

Third Embodiment

A third embodiment is an extension of the first embodiment into a network environment. In the third embodiment, in a video processing system in which an image capturing apparatus and a processing apparatus are connected over a network, the transformation parameters required for the perspective correction are calculated in the processing apparatus, and are transmitted to the image capturing apparatus. The image capturing apparatus then applies the perspective correction to a frame image obtained by shooting using the transformation parameters, and transmits a transformed frame image applied with the perspective correction to the processing apparatus. In the third embodiment as well, different transmission rates are used for transmitting the frame image from the image capturing apparatus to the processing apparatus for the calculation of the transformation parameters and the transformed frame image (a lower transmission rate is used for the frame image).

Figure 14:
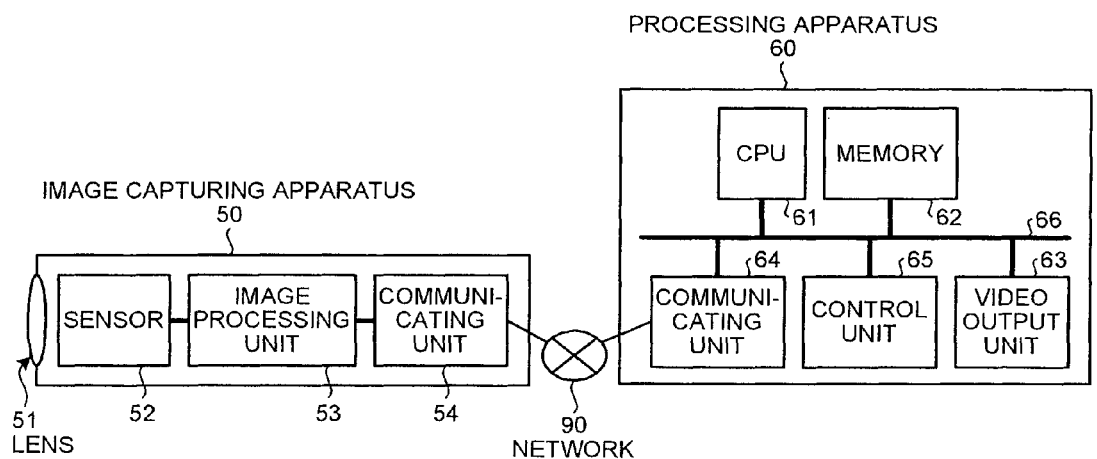
FIG. 14 is a schematic of a structure of a video processing system according to a third embodiment of the present invention.

FIG. 14 illustrates an example of a structure of a video processing system according to the third embodiment. The video processing system according to the third embodiment includes an image capturing apparatus 50, a processing apparatus 60, and a network 90. The processing apparatus 60 is a surveillance center, for example.

The image capturing apparatus 50 includes a lens 51, a sensor 52 such as a CCD or a CMOS for converting an optical image imaged by the lens 51 into a frame image in the form of an electrical signal, an image processing unit 53 such as an ISP that performs various image processes to a frame image, and a communicating unit 54 that transmits and receives a frame image, a transformed frame image, transformation parameters, control signals, and the like to and from the processing apparatus 60 over the network 90.

The processing apparatus 60 includes a CPU 61 that executes various processes, a memory 62 storing therein various types of software and data required for processes executed by the CPU 61, the frame image, the transformed frame image, and the like, a video output unit 63 that transmits a video signal to a monitor and the like connected to the processing apparatus 60, a communicating unit 64 that transmits and receives a frame image, a transformed frame image, transformation parameters, control signals and the like to and from the image capturing apparatus 50 over the network 90, a control unit 65 that controls the entire apparatus, and a bus 66 connecting each of these units. A RAM, a ROM, an HDD, and the like are collectively referred to as the memory 62. A user operation instruction receiving unit and the like are also included in the processing apparatus 60, but omitted in FIG. 14.

In the third embodiment, the image processing unit 53 in the image capturing apparatus 50 has an image transformation function for the perspective correction, and the CPU 61 included in the processing apparatus 60 has a function of calculating the transformation parameters used for the perspective correction, in the same manner as in the first embodiment described above.

Figure 15:
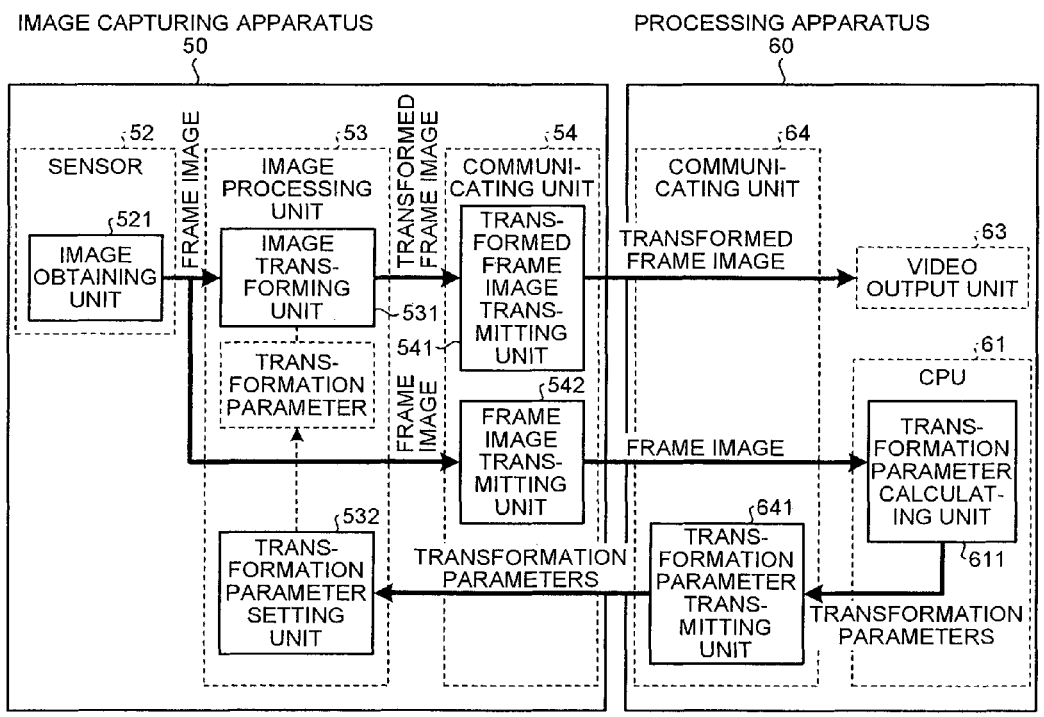
FIG. 15 is a functional block diagram of the video processing system according to the third embodiment.

FIG. 15 illustrates an overall functional block diagram of the video processing system according to the third embodiment. In the image capturing apparatus 50, an image obtaining unit 521 generates a frame image, and transmits the frame image to an image transforming unit 531 and a frame image transmitting unit 542. The frame image transmitting unit 542 transmits the frame image to the processing apparatus 60 over the network 90. In the processing apparatus 60, a transformation parameter calculating unit 611 calculates the transformation parameters from the frame image, and transmits the transformation parameters to a transformation parameter transmitting unit 641. The transformation parameter transmitting unit 641 transmits the transformation parameters to the image capturing apparatus 50 over the network 90. In the image capturing apparatus 50, a transformation parameter setting unit 532 sets the transformation parameters in the processing unit. The image transforming unit 531 generates a transformed frame image by applying the image transformation to the frame image based on the transformation parameters thus set, and transmits the transformed image to a transformed frame image transmitting unit 541. The transformed frame image transmitting unit 541 transmits the transformed frame image to the processing apparatus 60 over the network 90. In the processing apparatus 60, the transformed frame image is displayed onto a video output device such as a display connected to the processing apparatus 60.

The method for calculating the transformation parameters required for the perspective correction and the method for applying the perspective correcting process to the frame image are the same as those according to the first embodiment. Therefore, explanations thereof are omitted herein.

In the third embodiment as well, because the frame image transmitted from the image capturing apparatus 50 to the processing apparatus 60 is used for calculating the transformation parameters, the frame image does not necessarily have to be transmitted to the processing apparatus 60 in real time. Therefore, the frame image may be transmitted at a transmission rate that is lower than the rate at which the transformed frame image is transmitted. Furthermore, as mentioned earlier in the first embodiment, frame images may be transmitted at a regular interval or only when a user instruction is received. In this manner, the process can be streamlined, and the network 90 can be used effectively.

Fourth Embodiment

A fourth embodiment is an extension of the second embodiment into a network environment. In the fourth embodiment, in a video processing system in which an image capturing apparatus and a processing apparatus are connected over a network, the transformation parameters required for the digital zooming are calculated in the processing apparatus, and are transmitted to the image capturing apparatus. The image capturing apparatus then applies the digital zooming to a frame image obtained by shooting using the transformation parameters, and transmits a transformed frame image applied with the digital zooming to the processing apparatus. In the fourth embodiment as well, different transmission rates are used for transmitting the frame image from the image capturing apparatus to the processing apparatus for the calculation of the transformation parameters and the transformed frame image (a lower transmission rate is used for the frame image).

Figure 16:
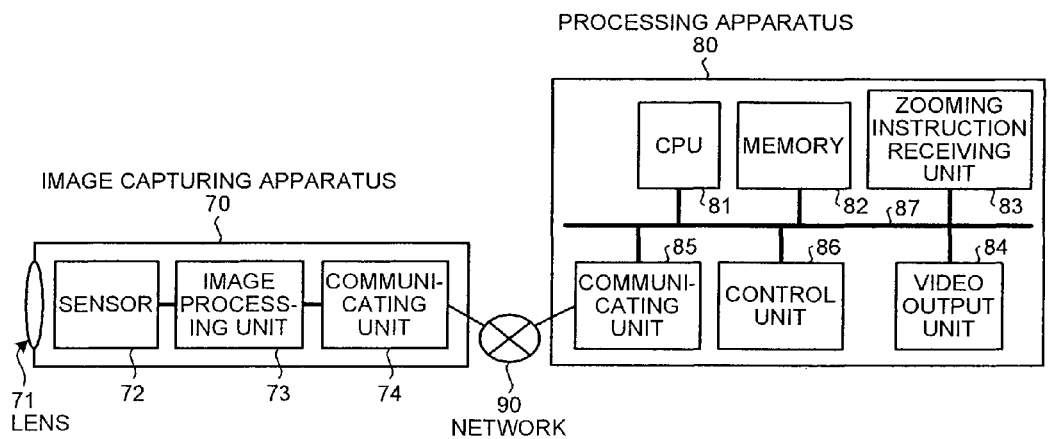
FIG. 16 is a schematic of a structure of a video processing system according to a fourth embodiment of the present invention.

FIG. 16 illustrates an example of a structure of a video processing system according to the fourth embodiment. The video processing system according to the fourth embodiment includes an image capturing apparatus 70, a processing apparatus 80, and a network 90, in the same manner as in the third embodiment. The processing apparatus 80 is a surveillance center, for example.

The image capturing apparatus 70 includes a lens 71, a sensor 72 such as a CCD or a CMOS for converting an optical image imaged by the lens 71 into a frame image in the form of an electrical signal, an image processing unit 73 such as an ISP that performs various image processes to a frame image, and a communicating unit 74 that transmits and receives a frame image, a transformed frame image, transformation parameters, control signals, and the like to and from the processing apparatus 80 over the network 90.

The processing apparatus 80 includes a CPU 81 that executes various processes, a memory 82 storing therein various types of software and data required for processes executed by the CPU 81, the frame image, the transformed frame image, and the like, a zooming instruction receiving unit 83 that receives a zooming instruction from a user, a video output unit 84 that transmits a video signal to a monitor and the like connected to the processing apparatus 80, a communicating unit 85 that transmits and receives a frame image, a transformed frame image, transformation parameters, control signals and the like to and from the image capturing apparatus 70 over the network 90, a control unit 86 that controls the entire apparatus, and a bus 87 connecting each of these units. A RAM, a ROM, an HDD, and the like are collectively referred to as the memory 82.

In the fourth embodiment, the image processing unit 73 in the image capturing apparatus 70 has an image transformation function for digital zooming, and the CPU 81 in the processing apparatus 80 has a function of calculating the transformation parameters used in the digital zooming process, in the same manner as in the second embodiment explained above.

Figure 17:
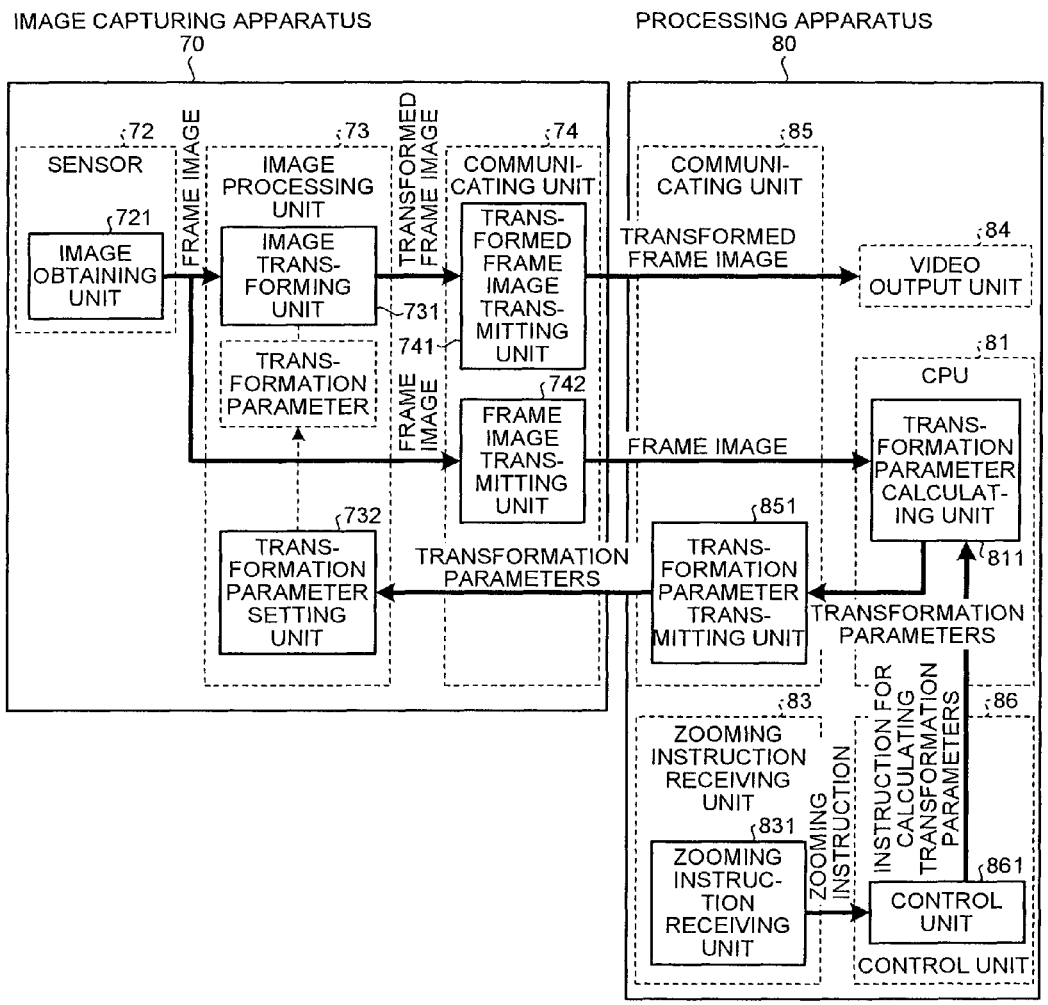
FIG. 17 is a functional block diagram of the video processing system according to the fourth embodiment.

FIG. 17 illustrates an overall functional block diagram of the video processing system according to the fourth embodiment. In the image capturing apparatus 70, an image obtaining unit 721 generates a frame image, and transmits the frame image to an image transforming unit 731 and a frame image transmitting unit 742. The frame image transmitting unit 742 transmits the frame image to the processing apparatus 80 over the network 90. In the processing apparatus 80, when a zoom-in/zoom-out instruction is received from a user, a zooming instruction receiving unit 831 notifies a control unit 861 with the instruction, and the control unit 861 instructs a transformation parameter calculating unit 811 to calculate the transformation parameters. The transformation parameter calculating unit 811 calculates the transformation parameters based on the frame image and the press-down state of the zoom button, and transmits the transformation parameters to a transformation parameter transmitting unit 851. The transformation parameter transmitting unit 851 transmits the transformation parameters to the image capturing apparatus 70 over the network 90. In the image capturing apparatus 70, a transformation parameter setting unit 732 sets the transformation parameters in the image processing unit 73. The image transforming unit 731 generates a transformed frame image by applying the digital zooming process to the frame image based on the transformation parameters thus set, and transmits the transformed image to a transformed frame image transmitting unit 741. The transformed frame image transmitting unit 741 transmits the transformed frame image to the processing apparatus 80 over the network 90. In the processing apparatus 80, the transformed frame image is displayed onto a video output device such as a display connected to the processing apparatus 80.

When no zooming instruction is received from a user, the image transforming unit 731 in the image capturing apparatus 70 transmits the frame image received from the image obtaining unit 721 as it is to the transformed frame image transmitting unit 741, and the transformed frame image transmitting unit 741 also transmits the frame image as it is to the processing apparatus 80.

The method for calculating the transformation parameters required for the digital zooming process and the method for applying the digital zooming process to the frame image are the same as those according to the second embodiment. Therefore, explanations thereof are omitted herein.

In the fourth embodiment as well, because the frame image transmitted from the frame image transmitting unit 742 to the processing apparatus 80 is used for calculating the transformation parameters, the frame image does not necessarily have to be transmitted to the processing apparatus 80 in real time. Therefore, the frame image may be transmitted at a transmission rate that is lower than the rate at which the frame image or the transformed frame image is transmitted from the transformed frame image transmitting unit 741 to the processing apparatus 80. Furthermore, the frame image transmitting unit 742 may transmit the frame image only when a zoom-in/zoom-out instruction is received from a user, as mentioned earlier in the second embodiment. In this manner, the process can be streamlined, and the network 90 can be used effectively.

The third embodiment and the fourth embodiment may be combined as well. In such a case, most structures and functions can be shared.

Fifth Embodiment

In a fifth embodiment, a teleconference system using the video processing apparatus according to the first embodiment and/or the second embodiment will be described.

Figure 18:
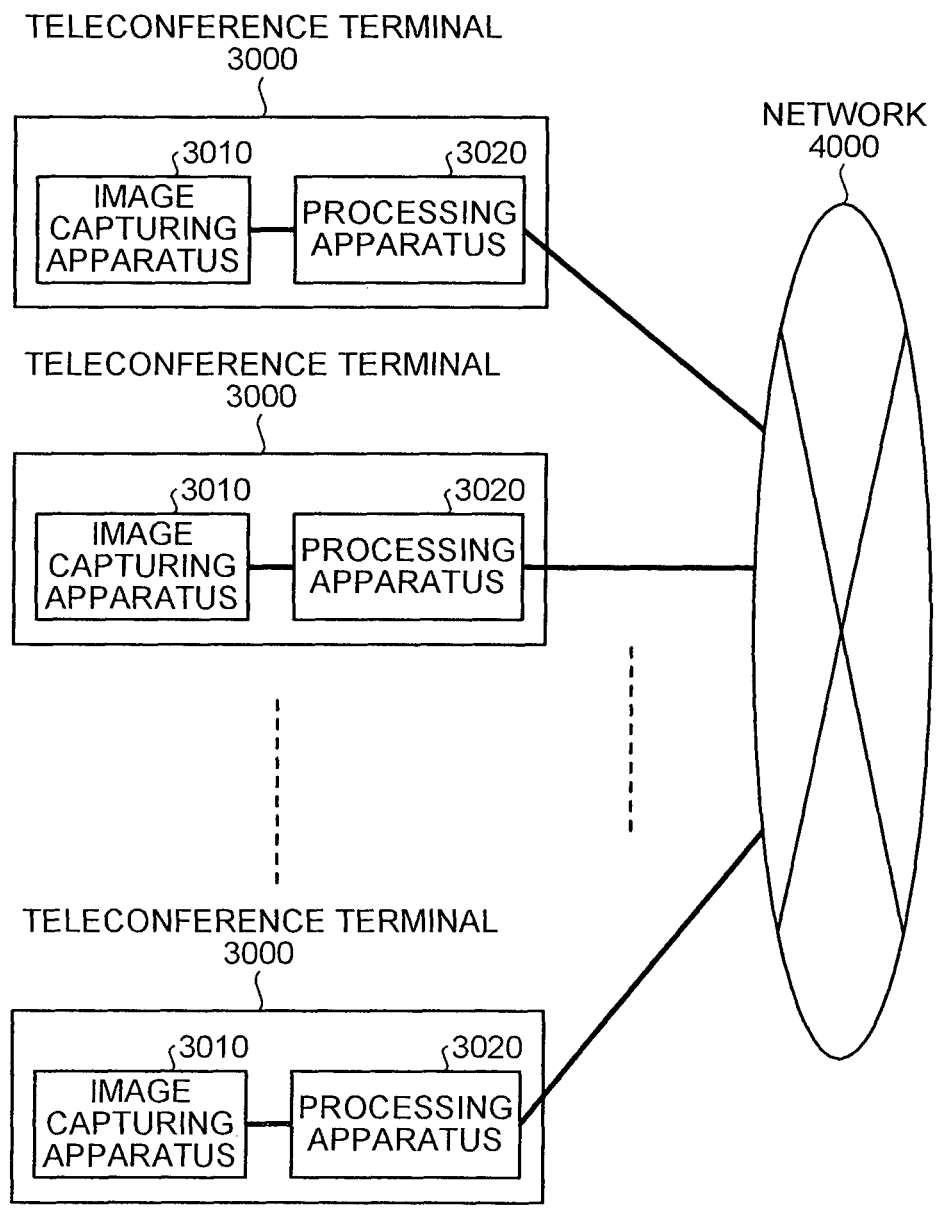
FIG. 18 is a schematic of a structure of a teleconference system according to a fifth embodiment of the present invention.

FIG. 18 illustrates a schematic of a general structure of the teleconference system according to the fifth embodiment. The teleconference system includes a plurality of teleconference terminals 3000 and a network 4000 to which the teleconference terminals 3000 are connected. Each teleconference terminal 3000 includes an image capturing apparatus 3010 and a processing apparatus 3020. The image capturing apparatus 3010 and the processing apparatus 3020 have the same functions as those in the video processing apparatus according to any one of the first embodiment and the second embodiment or both. In the fifth embodiment, the apparatuses have the same functions as those according to both of the first embodiment and the second embodiment. A microphone, a speaker, a display, and the like are also included in each teleconference terminal 3000, although omitted in FIG. 18, and are connected to the processing apparatus 3020 in the same manner as the image capturing apparatus 3010.

As explained in the first embodiment, a video shot by the image capturing apparatus 3010 in one teleconference terminal 3000 is applied with the perspective correction by cooperation between the image capturing apparatus 3010 and the processing apparatus 3020 in the teleconference terminal 3000, and is displayed onto a display in the teleconference terminal 3000. At the same time, the video applied with the perspective correction is transmitted to the other teleconference terminals 3000 connected over the network 4000, and is displayed onto a display included in each.

Furthermore, as explained in the second embodiment, when a user presses down a zoom-in/zoom-out button on one teleconference terminal 3000, the digital zooming process is performed in the same manner, by cooperation between the image capturing apparatus 3010 and the processing apparatus 3020 included in the teleconference terminal 3000, and the digitally zoomed video is displayed onto the display in the teleconference terminal 3000. At the same time, the digitally zoomed video is transmitted to the other teleconference terminals 3000 connected over the network 4000, and is displayed onto the display included in each.

In the teleconference system according to the fifth embodiment, a video applied with perspective correction or digital zooming can be displayed in real time onto a plurality of teleconference terminals connected over a network.

Sixth Embodiment

In a sixth embodiment, remote surveillance system using the video processing system according to the third embodiment and/or the fourth embodiment will be described.

Figure 19:
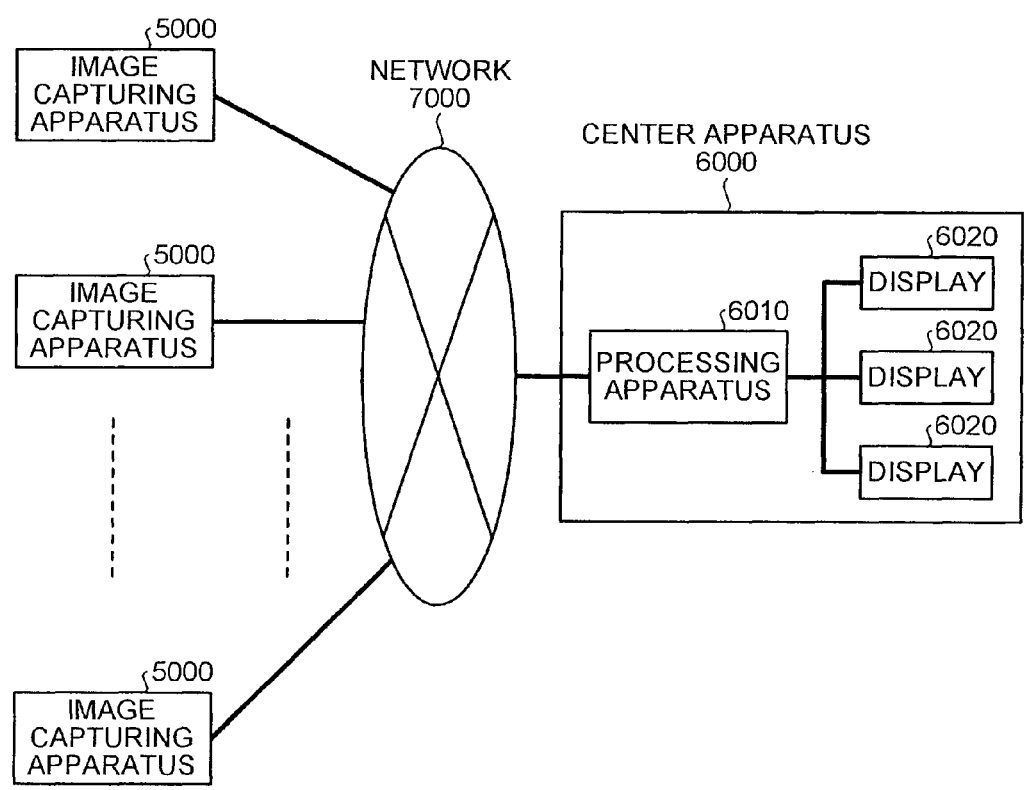
FIG. 19 is a schematic of a structure of a remote surveillance system according to a sixth embodiment of the present invention.

FIG. 19 illustrates a schematic of a general structure of the remote surveillance system according to the sixth embodiment. The remote surveillance system includes a plurality of image capturing apparatuses 5000, a center apparatus 6000, and a network 7000 connecting the image capturing apparatuses 5000 and the center apparatus 6000. Each of the image capturing apparatuses 5000 is used in a manner installed in a location to be monitored. The center apparatus 6000 is installed in a surveillance center, for example. The center apparatus 6000 includes a processing apparatus 6010 and a plurality of displays 6020 corresponding to the respective image capturing apparatuses 5000. One display 6020 may be provided, and the videos from the image capturing apparatuses 5000 may be displayed in multiplicity.

The remote surveillance system has a structure having the same functions as those included in the video processing system according to any one of the third embodiment and the fourth embodiment or both, except that the image capturing apparatus is included in plurality. In the sixth embodiment, the system structure has the functions of both of the third embodiment and the fourth embodiment.

As explained in the third embodiment, a video shot by one image capturing apparatus 5000 is applied with the perspective correcting process by cooperation between the apparatus 5000 and the processing apparatus 6010 in the center apparatus 6000, and is displayed onto a display 6020 corresponding to the image capturing apparatus 5000 in the center apparatus 6000. Videos shot by the other image capturing apparatuses 5000 are also applied with the perspective correcting process, and are displayed onto displays 6020 corresponding to the respective image capturing apparatuses 5000 in the center apparatus 6000.

Furthermore, as explained in the fourth embodiment, when a zoom-in/zoom-out instruction is received from a surveillant for a video shot by one image capturing apparatus 5000, the video in the image capturing apparatuses 5000 is applied with the digital zooming process by cooperation between the image capturing apparatuses 5000 and the processing apparatus 6010 in the center apparatus 6000, and the video displayed on the display 6020 corresponding to the image capturing apparatus 5000 in the center apparatus 6000 is switched to a zoom-in/zoom-out display.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A video processing apparatus, comprising:
   an image capturing apparatus; and
   a processing apparatus connected to the image capturing apparatus,
   the image capturing apparatus comprising:
      an image obtaining unit that obtains frame images; and
      first circuitry configured to transmit a predetermined frame image of the frame images obtained by the image obtaining unit to the processing apparatus,
   the processing apparatus comprising second circuitry configured to
      calculate transformation parameters for an image transformation process using the predetermined frame image received from the image capturing apparatus; and
      transmit the transformation parameters to the image capturing apparatus, and
   the first circuitry is further configured to, for each transformation parameter received from the processing apparatus,
      set the transformation parameter as a parameter to be used for the image transformation process of a frame image of the frame images obtained by the image obtaining unit,
      apply the image transformation process to the frame image, according to the parameter to be used, to generate a transformed frame image, and
      transmit the transformed frame image to the processing apparatus.

2. The video processing apparatus according to claim 1, wherein the first circuitry transmits the predetermined frame image and the transformed frame image at different transmission rates.

3. The video processing apparatus according to claim 1, wherein
   the first circuitry applies a perspective correction to the frame image, and
   the second circuitry detects a subject area from the frame image, and calculates the transformation parameters for the perspective correction.

4. The video processing apparatus according to claim 3, wherein
   the first circuitry transmits frame images to the processing apparatus at a regular interval, and
   the second circuitry recalculates the transformation parameters for the perspective correction using the frame images received from the image capturing apparatus at the regular interval.

5. The video processing apparatus according to claim 3, wherein
   the first circuitry transmits the frame image to the processing apparatus only when a user instruction is received, and
   upon receiving the frame image from the image capturing apparatus, the second circuitry recalculates the transformation parameters for the perspective correction using the frame image.

6. The video processing apparatus according to claim 1, wherein
   the second circuitry is further configured to
      receive a zooming instruction for the frame image from a user, and
      calculate transformation parameters for digital zooming for enabling a frame image area specified by the user to be displayed entirely in an image, and
   the first circuitry applies the digital zooming to the frame image.

7. The video processing apparatus according to claim 6, wherein the first circuitry transmits the frame image to the processing apparatus only when the zooming instruction is received from the user.

8. A video processing system, comprising:
   an image capturing apparatus; and
   a processing apparatus connected to the image capturing apparatus over a network,
   the image capturing apparatus comprising:
      an image obtaining unit that obtains frame images; and
      first circuitry configured to transmit a predetermined frame image of the frame images obtained by the image obtaining unit to the processing apparatus over the network,
   the processing apparatus comprising second circuitry configured to
      calculate transformation parameters for an image transformation process using the predetermined frame image received from the image capturing apparatus over the network; and
      transmit the transformation parameters to the image capturing apparatus over the network, and
   the first circuitry is further configured to, for each transformation parameter received from the processing apparatus over the network,
      set the transformation parameter as a parameter to be used for the image transformation process of a frame image of the frame images obtained by the image obtaining unit,
      apply the image transformation process to the frame image, according to the parameter to be used, to generate a transformed frame image, and
      transmit the transformed frame image to the processing apparatus over the network.

9. The video processing system according to claim 8, wherein the first circuitry transmits the predetermined frame image and the transformed frame image at different transmission rates.

10. The video processing system according to claim 8, wherein
    the first circuitry applies a perspective correction to the frame image, and the second circuitry detects a subject area from the frame image, and calculates the transformation parameters for the perspective correction.

11. The video processing system according to claim 10, wherein
the first circuitry transmits frame images to the processing apparatus over the network at a regular interval, and
the second circuitry recalculates the transformation parameters for the perspective correction using the frame images received from the image capturing apparatus over the network at the regular interval.

12. The video processing system according to claim 10, wherein
the first circuitry transmits the frame image to the processing apparatus over the network only when a user instruction is received, and
upon receiving the frame image from the image capturing apparatus, the second circuitry recalculates the transformation parameters for the perspective correction using the frame image.

13. The video processing system according to claim 8, wherein
the second circuitry is further configured to
receive a zooming instruction for the frame image from a user, and
calculate transformation parameters for digital zooming for enabling a frame image area specified by the user to be displayed entirely in an image, and
the first circuitry applies the digital zooming to the frame image.

14. The video processing system according to claim 13, wherein the first circuitry transmits the frame image to the processing apparatus over the network only when the zooming instruction is received from the user.

15. A video processing method for an image capturing apparatus and a processing apparatus, the video processing method comprising:
obtaining, by the image capturing apparatus, frame images;
transmitting, by the image capturing apparatus, a predetermined frame image of the frame images to the processing apparatus;
calculating, by the processing apparatus, transformation parameters for an image transformation process using the predetermined frame image received from the image capturing apparatus;
transmitting, by the processing apparatus, the transformation parameters to the image capturing apparatus;
setting, by circuitry of the image capturing apparatus for each transformation parameter received from the processing apparatus, the transformation parameter as a parameter to be used for the image transformation process of a frame image of the obtained frame images;
applying, by the circuitry of the image capturing apparatus, the image transformation process to the frame image, according to the parameter to be used, to generate a transformed frame image; and
transmitting, by the image capturing apparatus, the transformed frame image to the processing apparatus.

* * * * *